Patented Sept. 5, 1950

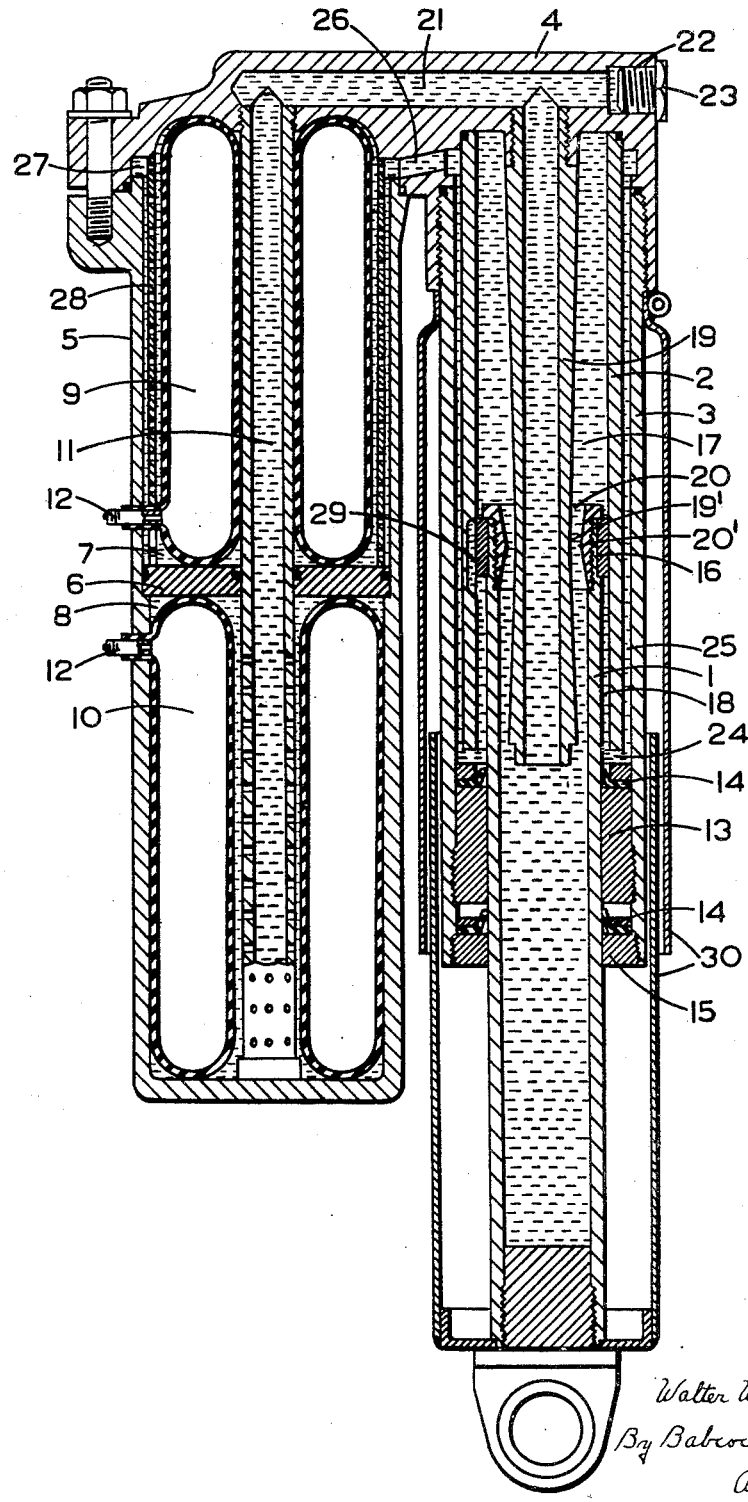

2,521,074

UNITED STATES PATENT OFFICE 2,521,074

FLUID ACTUATED SUSPENSION DEVICE FOR VEHICLES, AIRCRAFT, AND THE LIKE

Walter Wilson Marston, Wednesfield, England

Application February 24, 1948, Serial No. 10,438
In Great Britain August 16, 1946

7 Claims. (Cl. 267—64)

This invention relates to shock absorbing suspension devices of the fluid actuated type for vehicles, aircraft and the like of the kind embodying a pair of telescopic members connected between the wheel mounting or equivalent and the vehicle chassis or equivalent to define a working space or spaces of variable volume occupied by a hydraulic fluid so that relative movement of the telescopic members in one direction causes an increase of pressure in the hydraulic fluid which pressure is in turn transmitted by the said hydraulic fluid to a compressible fluid separated by movable means from the hydraulic fluid, said compressible fluid acting as a spring and adapted to resiliently oppose movement to the telescopic members in said direction.

The object of the present invention is to provide an improved construction of suspension device of the specified type wherein movement of the telescopic members in either direction is resiliently opposed by a compressible fluid.

The present invention is characterized by the compressible fluid being disposed in two containers one of which is acted upon by hydraulic fluid from one working space of the telescopic pair, whilst the other container is acted upon by hydraulic fluid from a second working space, of the telescopic pair, so that relative movement in either direction of the telescopic members will cause the hydraulic fluid to act upon the compressible fluid in one or other of the containers to compress the fluid therein causing said compressible fluid to act as springs to resiliently oppose the relative movement of the telescopic pair.

In the accompanying drawing there is shown in section a suspension device according to the present invention.

Referring to the drawing the telescopic pair comprises a hollow piston 1 closed at its lower end and adapted to be connected at said end to a wheel mounting or the like, and a cylinder 2 which is located within a cylindrical housing 3 said cylindrical housing being screwed into a head 4.

Bolted to the head 4 is a closed cylindrical container 5 provided with a fluid tight partition 6 to define upper and lower chambers 7, 8, in which are located inflatable rubber air bags 9, 10.

The rubber bags 9, 10 are of annular form and surround a conduit 11 extending from the head 4 to the bottom of the container 5. Each bag is provided with a suitable valve 12 extending through the wall of the container 5 to enable the bags to be readily inflated to the desired pressure as required.

The head 4 and container 5 are mounted on the vehicle chassis or equivalent in any suitable manner. The cylindrical housing 3 is provided at its lower end with a bushing 13 to form a bearing for the piston 1 to slide therein and also provided with sealing means 14 and a closure member 15.

The hollow piston 1 is provided with an enlarged head 16 to enable it to be a sealing fit in the cylinder 2 and, except as hereinafter described, form a seal between the upper working space 17 and the lower annular working space 18.

A tubular extension 19 from the head 4 extends downwardly therefrom and passes through an opening 20 in the piston 1 into the hollow interior of the latter.

The tubular extension 19 and conduit 11 are connected by a duct 21 in the head 4 said duct communicating with an opening 22 normally closed by a plug 23 for the purpose of filling the suspension device with hydraulic fluid.

The operation of the suspension device according to the present invention is as follows, assuming upward movement of the piston 1 due to the wheel or wheels of the vehicle associated therewith being subject to a road shock or the like the upper working space 17 is reduced in volume and hence pressure applied to the hydraulic fluid. Thus hydraulic fluid is caused to enter the already full piston 1 through the opening 20 in the head 16 thereof causing fluid to be forced under pressure up the tubular extension 19 which fluid movement is conveyed along the duct 21 to the conduit 11.

The conduit 11 is closed at its lower end and that part of it in the lower chamber 8 is perforated to permit hydraulic fluid to enter said chamber and compress the inflated rubber bag 10.

Thus the hydraulic fluid transmits the pressure created therein due to upward movement of the piston 1, to the air bag 10 which latter functions as an air spring resiliently opposing the movement of the piston 1 and effecting absorption of the road shock or the like.

Due to its inherent resiliency the air bag 10 tends to return to its normal volume reversing the movement of the hydraulic fluid which causes the piston 1 to be returned to its normal position, said position being determined by the load on the vehicle or the like at any given instant.

In order to resiliently oppose motion of the piston 1 in the opposite direction due to rebound from the above described movement, or when the wheel or wheels encounter a road depression or the like, the lower working space 18 is reduced in volume and applies pressure to the hydraulic fluid causing same to pass through the clearance 24 between the bottom of the cylinder 2 and the upper sealing means 14 into the annular chamber 25 formed between said cylinder 2 and the cylindrical housing 3.

Owing to the annular chamber 25 being already filled with hydraulic fluid some of said fluid is forced under pressure through the short duct 26 in the head 4 to a small annular chamber 27 communicating with the upper chamber 7 wherein the fluid is permitted to pass through a perforated sleeve 28 and compress the inflated rubber bag 9.

Thus in a similar manner to that hereinbefore described with reference to the air bag 10 resiliently opposing upward movement of the piston 1, downward movement thereof is resiliently opposed by the air bag 9 due to transmission of pressure thereto by the hydraulic fluid.

As in the case of the perforations of the conduit 11 perforations of the sleeve 28 cause the hydraulic fluid pressure to be evenly applied to the air bags 9, 10 preventing the latter being subject to localised high pressure.

In order to damp the motion of the piston in either direction the opening 20 in the piston head 16 is tapered internally to a point $20^1$ of minimum bore. The tubular extension 19 is tapered externally from a point $19^1$ of minimum diameter in either direction. Thus as the piston is moved in either direction the effective opening in the piston head 16 is reduced and due to the throttling of the hydraulic fluid passing therethrough into or out of the piston interior a damping effect on the motion of the latter is created.

It will be appreciated from the foregoing that the tendency of the device is to restore the piston to a neutral position, which position is indicated in the drawing. In order to ensure hydraulic fluid pressure equalization at this neutral position the two working spaces 17, 18, are communicated by means of one or more grooves 29 in the wall of the cylinder 2 said groove or grooves being of a length in excess of the length of the piston head 16.

It is to be understood that when the suspension device is charged with hydraulic fluid, due to the groove 29 the hydraulic fluid pressure on each side of the piston head 16 is equal although the device is supporting the weight of the vehicle over the wheel or axle with which the device is associated. The reason that the vehicle is supported is due to the fact that a greater area of piston head 16 is presented to the hydraulic fluid of working space 17 than to the hydraulic fluid of working space 18. However upon the vehicle being loaded a pressure difference is created.

The provision of the said groove or grooves 29 also permits all the various working spaces, chambers, ducts, and the like of the suspension device to be charged with hydraulic fluid from the opening 22.

The usual telescopic shields 30 are provided to protect the telescopic members.

I claim:

1. A fluid actuated suspension device for supporting a wheel axle from a vehicle comprising a piston adapted for connection to a vehicle wheel axle; a cylinder adapted for mounting on the vehicle in which cylinder the piston slides to define two working spaces for hydraulic fluid therein, said cylinder having a duct to communicate said working spaces at a predetermined position only of said piston in the cylinder; a container mounted with said cylinder, said container having two chambers therein for hydraulic fluid; a member having ducts connecting said cylinder with said container and effecting hydraulic fluid communication between each working space and a corresponding chamber; and movable members in each of said chambers adapted to separate the hydraulic fluid from compressible fluid in said chambers for resiliently accommodating pressure variations in the hydraulic fluid due to relative movement of the piston and cylinder.

2. A fluid actuated suspension device for supporting a wheel axle from a vehicle comprising a piston adapted for connection to a vehicle wheel axle; a cylinder adapted for mounting on the vehicle in which cylinder the piston slides to define two working spaces for hydraulic fluid therein, said cylinder having a duct to communicate said working spaces at a predetermined position only of said piston in the cylinder; a container mounted with said cylinder, said container having two chambers therein for hydraulic fluid; a member having ducts connecting said cylinder with said container and effecting hydraulic fluid communication between each working space and a corresponding chamber; and separate inflatable air bags disposed in each of said chambers adapted to resiliently accommodate pressure variations thereon by the hydraulic fluid due to relative movement of the piston and cylinder.

3. An improved fluid actuated suspension device for supporting a wheel axle from a vehicle, comprising a piston adapted for connection to a vehicle wheel axle, said piston having a head at each end, said heads being of different effective area; a cylinder adapted for mounting on the vehicle and in which cylinder the piston slides to define two working spaces therein for hydraulic fluid, a greater area of piston head being presented to one working space than the other for supporting the vehicle weight over the wheel axle, said cylinder having a duct to communicate said working spaces at a predetermined position only of said piston in the cylinder; a container mounted with said cylinder, said container having two chambers therein for hydraulic fluid; a member having ducts connecting said cylinder with said container and effecting hydraulic fluid communication between each working space and a corresponding chamber; and separate inflatable air bags disposed in each of said chambers adapted to resiliently accommodate pressure variations thereon by the hydraulic fluid due to relative movement of the piston and cylinder.

4. An improved fluid actuated suspension device for supporting a wheel axle from a vehicle, comprising a piston adapted for connection to a vehicle wheel axle; a cylinder adapted for mounting on the vehicle in which cylinder the piston slides to define two working spaces therein, said cylinder having a duct to communicate said working spaces at a predetermined position only of said piston in the cylinder; a container mounted with said cylinder; a hydraulic fluid tight partition to said container to define therein two chambers for hydraulic fluid; a head member having ducts connecting said cylinder with said container and effecting hydraulic fluid communication between each working space and a corresponding chamber; and separate inflatable air bags disposed in each of said chambers and adapted to resiliently accommodate pressure variations thereon by the hydraulic fluid due to relative movement of the piston and cylinder.

5. An improved fluid actuated suspension device for supporting a wheel axle from a vehicle, comprising a piston adapted for connection to a vehicle wheel axle, said piston being hollow and having an open end; a cylinder adapted for mounting on the vehicle and in which cylinder the piston slides to define two working spaces therein, said cylinder having a duct to communicate said working spaces at a predetermined position only of said piston in the cylinder; a container mounted with said cylinder; a hydraulic fluid tight partition to said container to define therein two chambers for hydraulic fluid; a head member having ducts connecting said cylinder with said container and effecting hydraulic fluid communication between each working space and a corresponding chamber; separate inflatable air bags disposed in each of said chambers adapted to resiliently accommodate pressure variations thereon by the hydraulic fluid due to relative movement of the piston and cylinder; and a tapered member fixed within the cylinder and extending within the hollow piston and adapted for throttling a flow of fluid between same and said piston to effect further damping of the relative motion of the piston and cylinder.

6. An improved fluid actuated suspension device for supporting a wheel axle from a vehicle, comprising a piston adapted for connection to a vehicle wheel axle, said piston having a head at each end, said heads being of different effective area; a cylinder adapted for mounting on the vehicle and in which cylinder the piston slides to define two working spaces therein for hydraulic fluid, a greater area of piston head being presented to one working space than the other for supporting the vehicle weight over the wheel axle, said cylinder having a duct to communicate said working spaces at a predetermined position only of said piston in the cylinder; a container mounted with said cylinder; a hydraulic fluid tight partition to said container to define therein two chambers for hydraulic fluid; a head member having ducts connecting said cylinder with said container and effecting hydraulic fluid communication between each working space and a corresponding chamber; and separate inflatable air bags disposed in each of said chambers adapted to resiliently accommodate pressure variations thereon by the hydraulic fluid due to relative movement of the piston and cylinder.

7. An improved fluid actuated suspension device for supporting a wheel axle from a vehicle, comprising a piston adapted for connection to a vehicle wheel axle, said piston being hollow and having an open end and also having a head at each end, said heads being of different effective area; a cylinder adapted for mounting on the vehicle and in which cylinder a piston slides to define two working spaces therein for hydraulic fluid, a greater area of piston head being presented to one working space than the other for supporting the vehicle weight over the wheel axle, said cylinder having a duct to communicate said working spaces at a predetermined position only of said piston in the cylinder; a container mounted with said cylinder; a hydraulic fluid tight partition to said container to define therein two chambers for hydraulic fluid; a head member having ducts connecting said cylinder with said container and effecting hydraulic fluid communication between each working space and a corresponding chamber; separate inflatable air bags disposed in each of said chambers adapted to resiliently accommodate pressure variations thereon by the hydraulic fluid due to relative movement of the piston and cylinder; and a tapered member fixed within the cylinder and extending within the hollow piston and adapted for throttling a flow of fluid between same and said piston to effect further damping of the relative motion of the piston and cylinder.

WALTER WILSON MARSTON.

REFERENCES CITED

The following references are of record in the file of this patent:

UNITED STATES PATENTS

| Number | Name | Date |
|---|---|---|
| 1,936,788 | Hardy | Nov. 28, 1933 |
| 2,165,465 | Ehrhardt et al. | July 11, 1939 |
| 2,451,171 | Mullen | Oct. 12, 1948 |